(12) United States Patent
Geveci et al.

(10) Patent No.: US 8,640,448 B2
(45) Date of Patent: Feb. 4, 2014

(54) TRANSIENT COMPENSATION CONTROL OF AN SCR AFTERTREATMENT SYSTEM

(75) Inventors: Mert Geveci, Albany, NY (US); Andrew W. Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 141 days.

(21) Appl. No.: 13/093,363

(22) Filed: Apr. 25, 2011

(65) Prior Publication Data
US 2012/0017567 A1    Jan. 26, 2012

Related U.S. Application Data

(60) Provisional application No. 61/330,605, filed on May 3, 2010.

(51) Int. Cl.
*F01N 3/10* (2006.01)
(52) U.S. Cl.
USPC ............ 60/301; 60/274; 60/286; 60/297; 60/303
(58) Field of Classification Search
USPC .............. 60/274, 286, 295, 297, 301, 303
See application file for complete search history.

(56) References Cited

U.S. PATENT DOCUMENTS

| | | | |
|---|---|---|---|
| 5,555,725 A | 9/1996 | Shimasaki et al. | |
| 5,645,745 A | 7/1997 | Hartwick et al. | |
| 5,746,053 A | 5/1998 | Hibino | |
| 6,069,013 A | 5/2000 | Plog et al. | |
| 6,314,722 B1 | 11/2001 | Matros et al. | |
| 6,347,544 B1 | 2/2002 | Hada et al. | |
| 6,415,602 B1 | 7/2002 | Patchett et al. | |
| 6,662,553 B2 | 12/2003 | Patchett et al. | |
| 6,742,326 B2 | 6/2004 | Xu et al. | |
| 6,755,014 B2 * | 6/2004 | Kawai et al. | 60/286 |
| 6,904,751 B2 | 6/2005 | Makki et al. | |
| 7,069,770 B2 | 7/2006 | Chen et al. | |
| 7,093,427 B2 | 8/2006 | Van Nieuwstadt et al. | |
| 7,150,145 B2 | 12/2006 | Patchett et al. | |
| 7,178,328 B2 | 2/2007 | Solbrig | |

(Continued)

FOREIGN PATENT DOCUMENTS

| | | |
|---|---|---|
| WO | 2007084690 | 7/2007 |
| WO | 2008009940 | 1/2008 |
| WO | 2009036780 | 3/2009 |
| WO | 2009089936 | 7/2009 |

OTHER PUBLICATIONS

International Search Report and Written Opinion, PCT/US2011/034807, Cummins Inc., Jul. 1, 2011, 11 pgs.

*Primary Examiner* — Binh Q Tran
(74) *Attorney, Agent, or Firm* — Krieg DeVault LLP

(57) ABSTRACT

A system includes an internal combustion engine, an exhaust conduit fluidly coupled to the internal combustion engine and an SCR catalyst, and a reductant doser operationally coupled to the exhaust conduit at a position upstream of the SCR catalyst. The reductant doser is responsive to a reductant doser command. The system includes a controller having a number of modules functionally structured to execute operations to compensate for transient operation of the system. An $NH_3$ target module interprets a reductant amount target that is a target amount of reductant in the exhaust conduit at a position upstream of the SCR catalyst. A transient adjustment module detects a transient event in the SCR catalyst and provides an adjusted reductant amount target in response to the transient event and the reductant amount target. A dosing control module provides the reductant doser command in response to the adjusted reductant amount target.

26 Claims, 5 Drawing Sheets

(56) References Cited

U.S. PATENT DOCUMENTS

| | | | |
|---|---|---|---|
| 7,204,081 B2 * | 4/2007 | Yasui et al. ............... 60/286 |
| 7,213,395 B2 | 5/2007 | Hu et al. |
| 7,426,825 B2 | 9/2008 | Viola et al. |
| 7,610,759 B2 | 11/2009 | Yoshida et al. |
| 7,613,561 B1 | 11/2009 | Stewart et al. |
| 7,810,313 B2 | 10/2010 | Stewart et al. |
| 8,112,986 B2 * | 2/2012 | Kurtz ....................... 60/285 |
| 8,176,730 B2 * | 5/2012 | Shimomura et al. ........ 60/295 |
| 8,201,394 B2 * | 6/2012 | Chi et al. ................... 60/286 |
| 8,281,578 B2 * | 10/2012 | Upadhyay et al. .......... 60/301 |
| 2002/0148220 A1 | 10/2002 | Patchett et al. |
| 2003/0061861 A1 | 4/2003 | Irion et al. |
| 2004/0083721 A1 | 5/2004 | Ketcher et al. |
| 2005/0127920 A1 | 6/2005 | Mowery et al. |
| 2007/0044456 A1 | 3/2007 | Upadhyay et al. |
| 2007/0080074 A1 | 4/2007 | Wang et al. |
| 2008/0022658 A1 | 1/2008 | Viola et al. |
| 2008/0250774 A1 | 10/2008 | Solbrig |
| 2009/0031710 A1 | 2/2009 | Wei et al. |
| 2009/0044526 A1 | 2/2009 | Carroll, III et al. |
| 2009/0272105 A1 | 11/2009 | Chi et al. |
| 2009/0301067 A1 | 12/2009 | Dingle et al. |
| 2010/0000202 A1 | 1/2010 | Fisher et al. |
| 2010/0024390 A1 | 2/2010 | Wills et al. |
| 2010/0024397 A1 | 2/2010 | Chi et al. |
| 2010/0043402 A1 | 2/2010 | Perry et al. |
| 2010/0068147 A1 | 3/2010 | Hibberd et al. |
| 2010/0122520 A1 | 5/2010 | Han |
| 2010/0242440 A1 | 9/2010 | Garimella et al. |

* cited by examiner

TRANSIENT COMPENSATION CONTROL OF AN SCR AFTERTREATMENT SYSTEM

RELATED APPLICATIONS

This application is related to, and claims the benefit of, U.S. Provisional application 61/330,605 "Ammonia sensor control of an SCR aftertreatment system," filed May 3, 2010, and U.S. patent application Ser. No. 13/051,693 "Ammonia sensor control of an SCR aftertreatment sensor," filed Mar. 18, 2011, both of which are incorporated herein by reference in the entirety for all purposes.

BACKGROUND

Many modern engines utilize selective catalytic reduction (SCR) catalysts to reduce $NO_x$ emissions from the system. An SCR catalyst is a dynamic component that adsorbs reductant (e.g. $NH_3$) and $NO_x$ from the exhaust gas, and reacts the reductant with the $NO_x$ to reduce the $NO_x$. The amount of $NH_3$ storage depends upon the temperature of the catalyst, and the $NO_x$ conversion capacity of the catalyst depends upon the temperature, the amount of $NH_3$ stored on the catalyst, and/or the flow rate of $NO_x$ and exhaust gases through the catalyst. Accordingly, under certain operating conditions, transient events with respect to temperature, exhaust flow rate, and/or $NO_x$ composition of the exhaust gases can cause undesirable operations of the SCR catalyst.

DESCRIPTION OF THE ILLUSTRATIVE EMBODIMENTS

Figure 1:
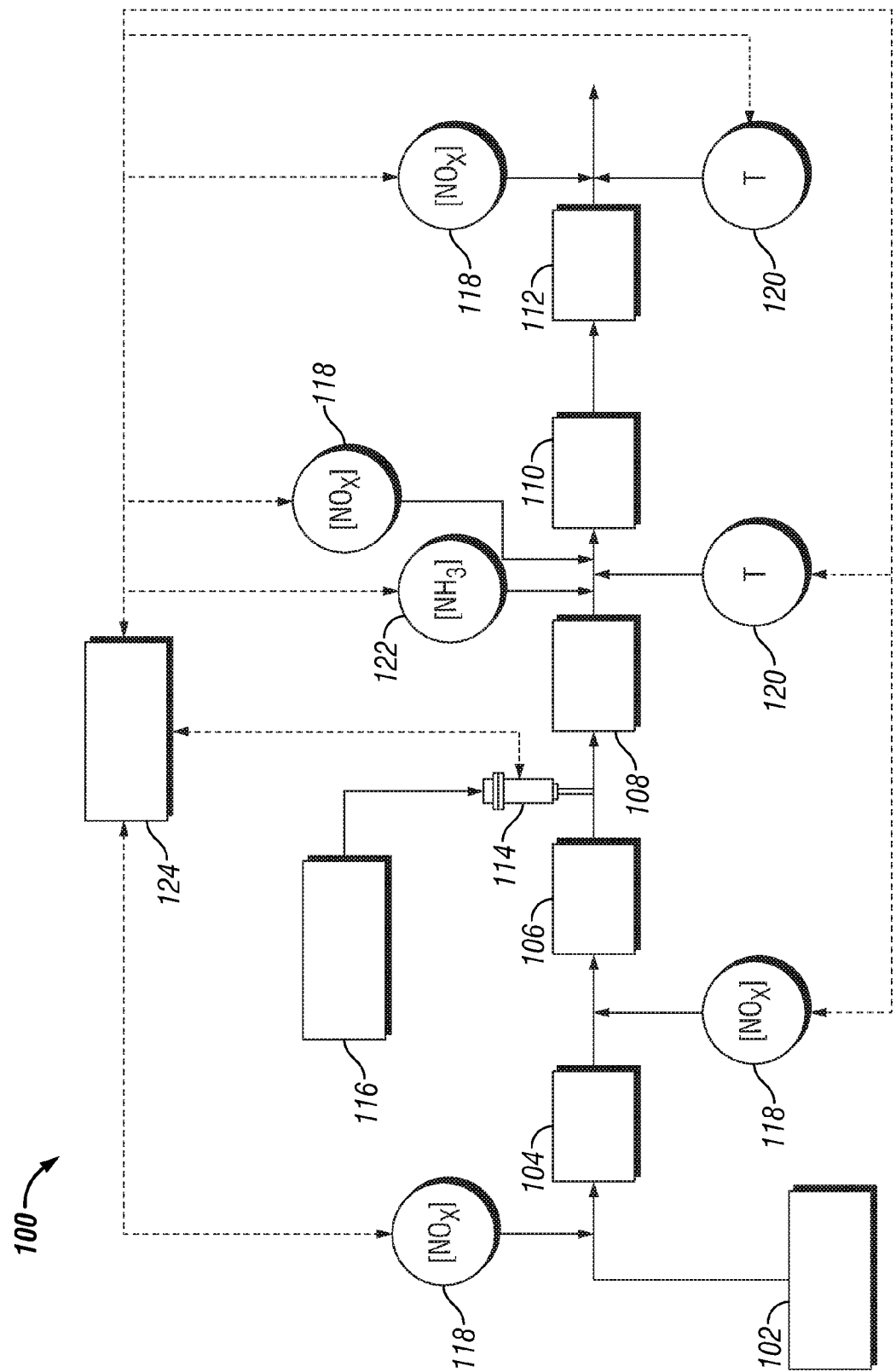
FIG. 1 is an exemplary system for transient compensation control of an SCR aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, an exemplary system for control of an SCR aftertreatment system 100 is shown. The SCR aftreatment system 100 includes an internal combustion engine 102 that produces exhaust gases including $NO_x$, and provides the exhaust gases to an exhaust conduit. The system further includes a first SCR catalyst 108 fluidly coupled to the exhaust conduit. The first SCR catalyst 108 is illustrated downstream of a diesel oxidation catalyst (DOC) 104 and a diesel particulate filter (DPF) 106. Any of these components may be present or missing, catalyzed or not catalyzed, and may be arranged in alternate order. Further, certain components or all components may be provided in the same or separate housings. In certain embodiments, the exhaust gases may be provided by any type of internal combustion engine.

The system further includes a second SCR catalyst 110 fluidly coupled to the exhaust conduit at a position downstream of the first SCR catalyst 108. The system includes an ammonia sensor 122 operationally coupled to the exhaust conduit at a position between the first SCR catalyst 108 and the second SCR catalyst 110. The first SCR catalyst 108 and the second SCR catalyst 110 may occur within the same catalyst brick, with the position of the ammonia sensor 122 defining the separation point between the first SCR catalyst 108 and the second SCR catalyst 110.

While the illustrative system 100 includes two SCR catalysts 108, 110 and an ammonia sensor 122 positioned therebetween, the transient control operations of the controller 124 may be present in any system 100 having $NO_x$ aftertreatment and a $NO_x$ treatment catalyst. Without limitation, the $NO_x$ treatment catalyst may include a single element, multiple elements, and/or one or more branches or bypasses of the exhaust gases.

The ammonia sensor 122 may be any type understood in the art. The system further includes a reductant doser 114 operationally coupled to the exhaust conduit at a position upstream of the first SCR catalyst 108. The reductant doser 114 is fluidly coupled to a reductant source such as a reductant storage tank 116. The reductant is any type of reductant utilized in an SCR aftertreatment system that results in ammonia being utilized as the final reductant—including at least ammonia (gaseous or aqueous) and urea. Certain operations described herein apply to $NO_x$ reduction generally and are not specific to SCR systems. Where the $NO_x$ reduction operations are not specific to SCR systems, hydrocarbon or other reductants may be utilized. Further, in some SCR systems, other reductants may be utilized during certain operating conditions, and the transient control operations described herein may be utilized with other reductants than ammonia producing reductants in SCR systems.

The system may include an ammonia oxidation catalyst (AMOX) 112 downstream of the second SCR catalyst 110, or after a last one of the SCR catalysts 108, 110. In certain embodiments, the AMOX 112 may not be present, or the AMOX 112 may be commingled with the second SCR catalyst 110 (or the last SCR catalyst, where multiple SCR catalysts are present), for example with a washcoat applied toward the rear portion of the second SCR catalyst 110 that is responsive to at least partially oxidize ammonia.

The exemplary system 100 further includes various sensors. The illustrated sensors include a $NO_x$ sensor 118 positioned upstream of the first SCR catalyst 108, a second $NO_x$ sensor 118 positioned downstream of the second SCR catalyst 110, a temperature sensor 120 positioned between the first and second SCR catalysts 108, 110, and a temperature sensor 120 positioned downstream of the AMOX catalyst 112. The illustrated sensors are exemplary only, and may be re-positioned, removed, substituted, and other sensors may be present that are not illustrated in FIG. 1. Certain embodiments of the system do not include a $NO_x$ sensor 118 present upstream of the first SCR catalyst 108, a $NO_x$ sensor present downstream of the second SCR catalyst 110, or do not include both of these $NO_x$ sensors. Further, certain sensors may be virtual sensors that are calculated from other parameters available to the system, or certain sensors may be values that would be indicated by sensors but that are supplied to a computer readable memory location, via a datalink or network communication, or otherwise made available to the system where the sensor providing the sensed parameter is not a part of the defined system 100.

In certain embodiments, the system 100 further includes a controller 124 structured to perform certain operations to provide transient compensation control of SCR aftertreatment systems. In certain embodiments, the controller forms a portion of a processing subsystem including one or more computing devices having memory, processing, and communication hardware. The controller may be a single device or a distributed device, and the functions of the controller may be performed by hardware or software. The controller may be in communication with any sensor, actuator, datalink, and/or network in the system.

In certain embodiments, the controller includes one or more modules structured to functionally execute the operations of the controller. In certain embodiments, the controller includes an $NH_3$ target module, a transient adjustment module, and/or a dosing control module. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Figure 2:
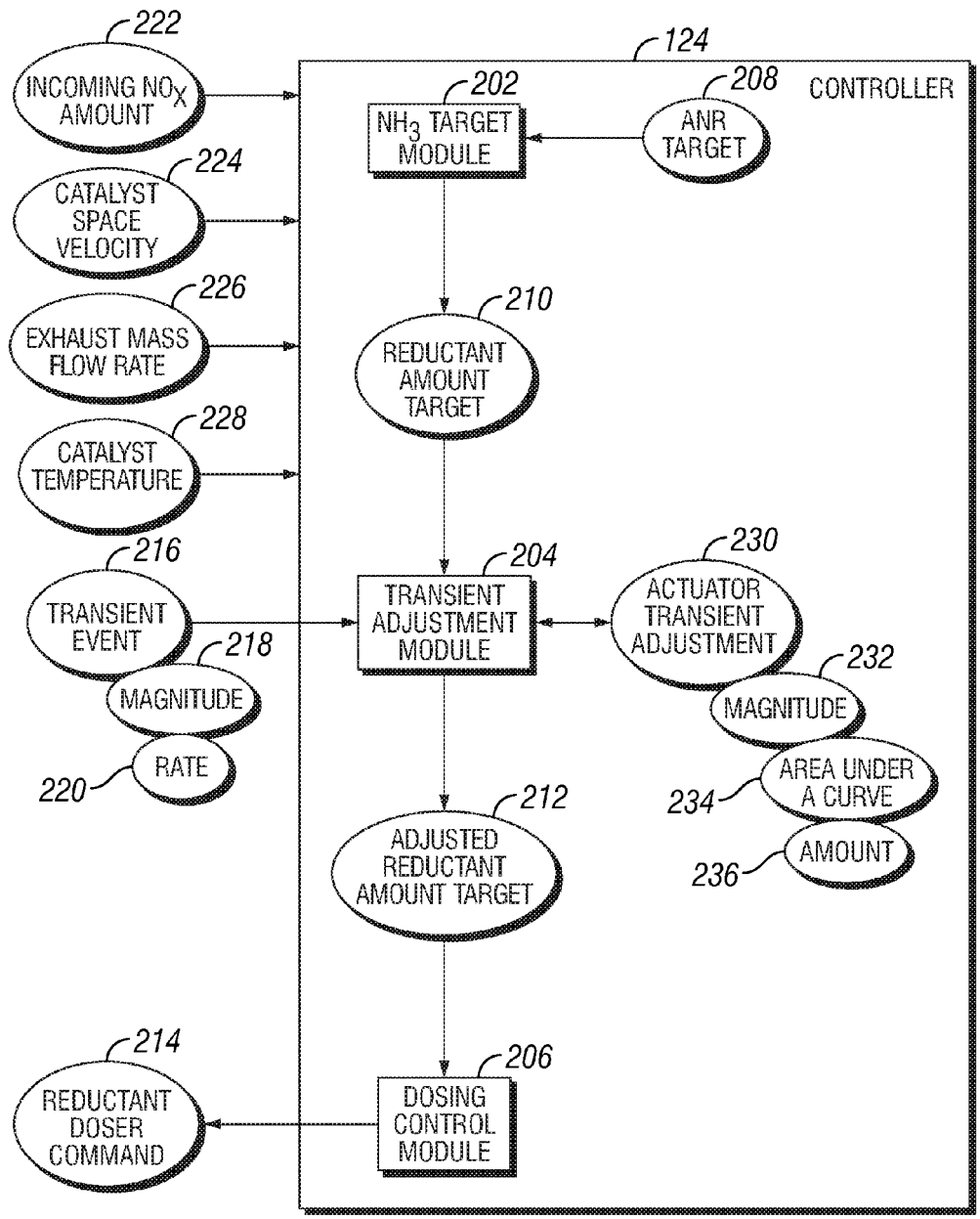
FIG. 2 is an exemplary controller for executing operations for transient compensation control of an SCR aftertreatment system.

The controller operations of the controller in FIG. 2 are operations that adjust nominal control operations for a $NO_x$ aftertreatment system utilizing a reductant. Nominal control operations for a $NO_x$ aftertreatment system, including an SCR aftertreatment system, are understood in the art and are not described further herein. Any nominal $NO_x$ aftertreatment control operations may be utilized, including without limitation control operations described in U.S. Provisional application 61/330,605 "Ammonia sensor control of an SCR aftertreatment system," filed May 3, 2010, and U.S. patent application Ser. No. 13/051,693 "Ammonia sensor control of an SCR aftertreatment sensor," filed Mar. 18, 2011.

Referencing FIG. 2, a controller 124 includes an $NH_3$ target module 202 that interprets a reductant amount target 210 that is a target amount of reductant in an exhaust conduit at a position upstream of a $NO_x$ reduction catalyst. In one example, the $NO_x$ reduction catalyst is an SCR catalyst and the reductant is $NH_3$ or a precursor (e.g. urea). The $NH_3$ target module 202, in one example, interprets the reductant amount target 210 in response to an ANR target 208 and an incoming $NO_x$ amount 222. The incoming $NO_x$ amount 222 may be determined from a sensor, a model, or brought in as a data parameter from another system or controller. The $NH_3$ target module 202 may further interpret the reductant amount target 210 in response to a catalyst space velocity 224 and/or an exhaust mass flow rate 226.

The controller 124 further includes a transient adjustment module 204 that detects a transient event 216, and provides an adjusted reductant amount target 212 in response to the transient event 216 and the reductant amount target 210. The controller 124 further includes a dosing control module 206 that provides a reductant doser command 214 in response to the adjusted reductant amount target 212.

In certain embodiments, the transient event 216 is a temperature decreasing event, having a magnitude 218 and/or a rate 220. In response to the temperature decreasing event, an exemplary transient adjustment module 204 provides the adjusted reductant amount target 212 as an amount greater than the reductant amount target 210. In certain embodiments, the transient adjustment module 204 provides an actuator transient adjustment 230 having a magnitude 232 determine in response to the magnitude 218 and/or rate 220 of the transient event 216. The transient adjustment module 204 adjusts the reductant amount target 210 in response to the actuator transient adjustment 230 to provide the adjusted reductant amount target 212.

In certain embodiments, the magnitude 232 of the actuator transient adjustment 230 includes an amount 236 of adjustment. For example, where the reductant amount target 210 is a value of 1.1 ANR, the actuator transient adjustment may be a value such as a 0.5 ANR offset (adjusted reductant amount target 212 is 1.6 ANR), a 2.2 ANR multiplier (adjusted reductant amount target 212 is 2.42 ANR), a high ANR value of 2.5 (adjusted reductant amount target 212 is 2.5 ANR), or other value understood in the art. The specific magnitudes 236 and adjustment functions of the actuator transient adjustment 230 and/or adjusted reductant amount target 212 are control selections for a particular system.

In certain embodiments, the magnitude 232 of the actuator transient adjustment 230 includes an area under a curve 234 of adjustment. For example, the adjusted reductant injection amount 212 can be a predetermined increase amount for a time determined according to a storage increase amount resulting from a transient event 216 having magnitude 218, an increase for a predetermined time at an increased injection rate determined according to a storage increase amount resulting from a transient event 216 having magnitude 218, and/or an integrated amount of increased reductant injection (adjusted reductant amount target 212 less the reductant amount target 210) such that an area under an injection rate-time curve is completed, where the area is determined according to the storage increase amount resulting from a transient event 216 having magnitude 218. In one example, the total amount of excess reductant injected is determined as an amount required to fill the $NH_3$ storage of an SCR catalyst, or a selected portion of the $NH_3$ storage of the SCR catalyst.

In certain embodiments, the transient adjustment module 204 further provides the adjusted reductant amount target in response to the incoming $NO_x$ amount 222, the catalyst space velocity 224, a current exhaust mass flow rate 226, and/or a catalyst temperature 228. In certain embodiments, one or more parameters 222, 224, 226, 228 are utilized to determine whether a transient event 216 has occurred. Additionally or alternatively, one or more parameters 222, 224, 226, 228 are utilized to determine a magnitude 232 of the actuator transient adjustment 230 in response to one or more of the parameters 222, 224, 226, 228. In certain embodiments, the catalyst temperature 228 may be a catalyst inlet temperature, a catalyst outlet temperature, a mid-bed (i.e. between catalyst beds) catalyst temperature, a mid-brick (i.e. within a single catalyst bed), a weighted average of one or more of the described temperatures, and/or a model of the catalyst temperature 228.

In one example, where a rapid catalyst temperature 228 increase is occurring, it may be understood that a decrease of $NH_3$ storage capacity on the SCR catalyst is going to occur. In one embodiment, the transient adjustment module 204 provides an actuator transient adjustment 230 that has a high initial magnitude 232 based upon the rate 220 of the temperature change that is occurring, and that includes an area under the time-adjustment curve that is based upon the final temperature that is expected or observed at the end of the temperature increase.

Figure 3:
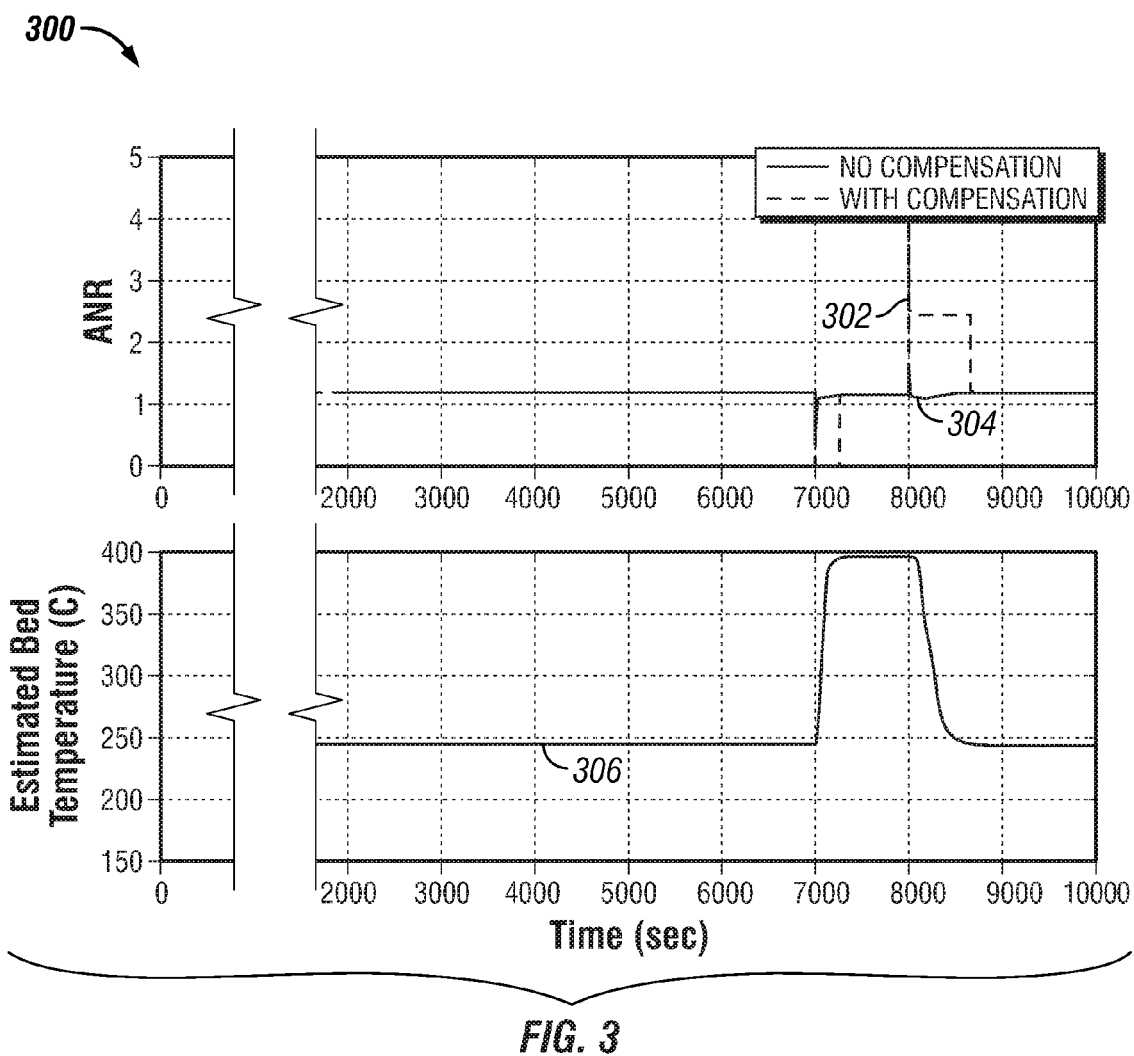
FIG. 3 provides illustrative data for a temperature increase transient in an SCR aftertreatment system, the data illustrated for a system with and without transient compensation.

Referencing FIG. 3, an illustrative modeled data set 300 is shown, where a bed temperature (curve 306) excursion occurs at around 7000 seconds. The transient adjustment module 204 provides an actuator transient adjustment, changing the ammonia reference target from around ANR 1.1 (seen on the compensated curve 302) to ANR 0.0 in response to the rapid temperature change from around 245° C. to around 400° C. The bed temperature resumes the normal temperature over a transition period beginning around 8000 seconds, and the transient adjustment module 204 provides an actuator transient adjustment, changing the ammonia reference target from around ANR 1.1 to ANR 2.4, with a rate-based actuator transient adjustment excursion to around 4.0 at the initial temperature drop. An uncompensated curve 304 is included for comparison. The reference adjustments are illustrative only.

Figure 4:
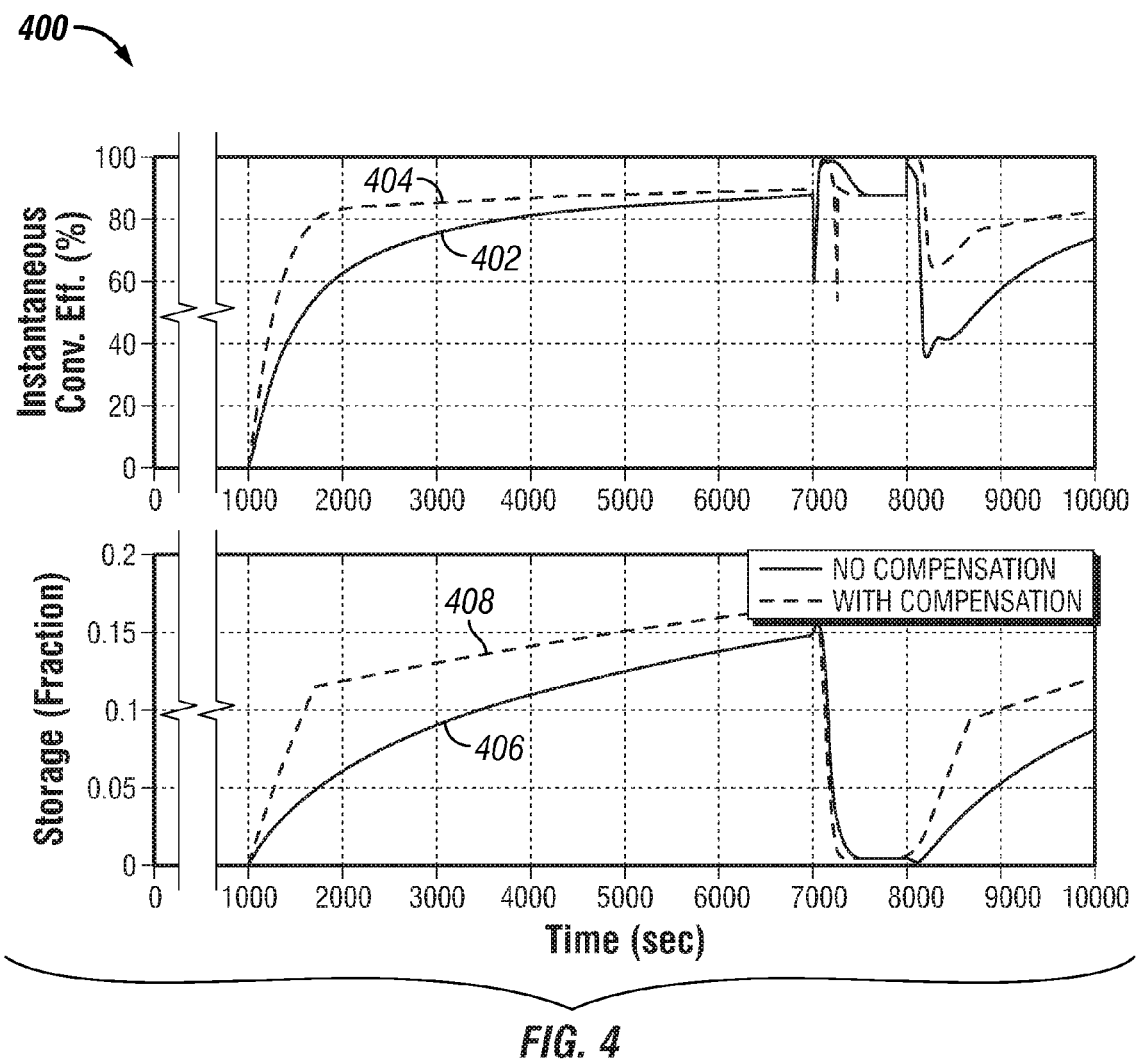
FIG. 4 provides illustrative data for a temperature decrease transient in an SCR aftertreatment system, the data illustrated for a system with and without transient compensation.

Referencing FIG. 4, it can be seen that the operations of the transient adjustment module 204 improve the conversion efficiency response of an SCR catalyst in curve 404 relative to the uncompensated conversion efficiency response curve 402. Further, the fraction of the storage capacity of the SCR catalyst that is filled improves as illustrated in curve 408 with transient compensation relative to the uncompensated curve 406. Curves 408 and 406 are responses to a temperature decrease in an SCR catalyst occurring at around 1000 seconds, and the responses are created from illustrative, modeled data.

Figure 5:
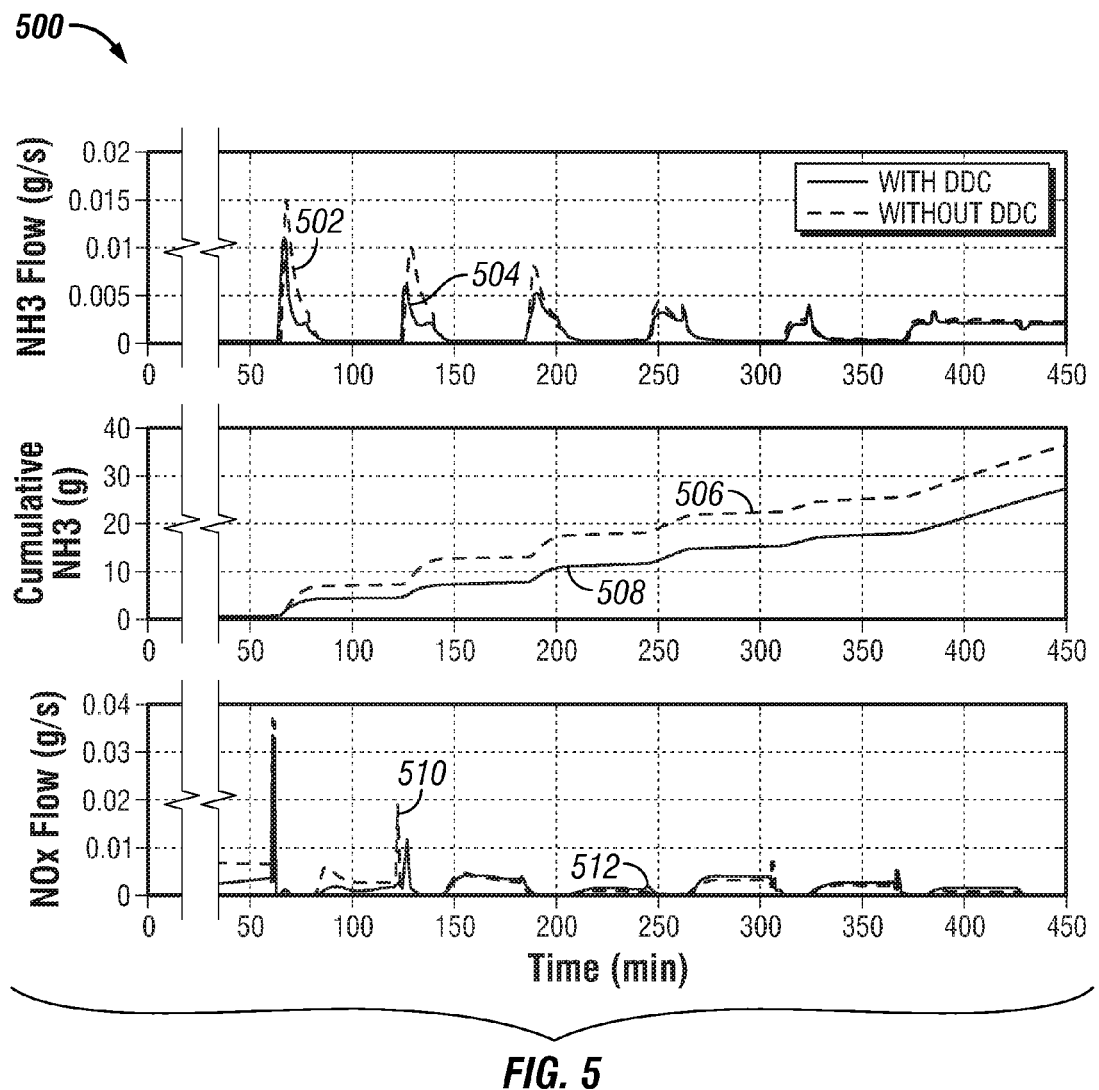
FIG. 5 provides illustrative data for engine exhaust flow transients in an SCR aftertreatment system, the data illustrated for a system with and without transient compensation.

Referencing FIG. 5., simulation data is shown for low temperature operation with temperature variances, and it is seen that the operations of the transient adjustment module reduce the instantaneous $NH_3$ slip (curve 502 is uncompensated, and curve 504 is compensated), as well as the cumulative $NH_3$ slipped from the system over time (curve 506 is uncompensated, and curve 508 is compensated). Further, transient compensation improves the $NO_x$-out emissions, illustrated by the responses of simulation curves 510 (uncompensated) and 512 (compensated), and especially improves (i.e., reduces) the magnitude of $NO_x$ spikes due to transients.

The descriptions which follow provide an illustrative embodiment of performing procedures for transient compensation control in a $NO_x$ reduction aftertreatment system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure includes an operation to interpret a reductant amount target that is a target amount of reductant in an exhaust conduit at a position upstream of a $NO_x$ reduction catalyst, and an operation to detect a transient event. The transient event includes an event that is expected to cause a change in at least one of a reductant storage capacity of the $NO_x$ reduction catalyst and a $NO_x$ reduction efficiency of the $NO_x$ reduction catalyst. In response to the transient event, the procedure includes an operation to provide an adjusted reductant amount target, and an operation to provide a reductant doser command in response to the adjusted reductant amount target.

The adjusted reductant amount target is an increased or decreased reductant dosing or injection amount. The adjusted amount includes any increased or decreased amount from a nominal amount, and may be determined in terms of a ratio of reductant to $NO_x$, such as an $NH_3$ to $NO_x$ ratio (ANR). The decreased reductant dosing amount may be any amount less than the nominal amount, down to a suspension of all reductant injection. For example, where the nominal ANR is 1, the decreased reductant dosing amount may be any amount between zero (inclusive) and 1 (exclusive). The increased reductant dosing amount may be any amount greater than the nominal amount, up to about three times to five times a stoichiometric reductant injection rate. The increased reductant amount may be higher than five times the stoichiometric reductant injection rate, depending upon the presence and capability of an AMOX catalyst, the desired $NH_3$ storage fill rate, and the amount of $NH_3$ slip from the system that is allowed under the current operating conditions.

An exemplary procedure further includes the transient event as a temperature decreasing event, and an operation to provide the adjusted reductant amount target as an amount greater than the reductant amount target. Another exemplary procedure includes the transient event as a temperature increasing event, and an operation to provide the adjusted reductant amount target as an amount less than the reductant amount target.

In certain embodiments, the operation to provide the adjusted reductant amount target includes an operation to determine a magnitude of the transient event. In certain further embodiments, the procedure includes an operation to determine the adjusted reductant amount to have a magnitude determined in response to the magnitude of the transient event. The magnitude of the actuator transient adjustment may be an injection rate adjustment of a reductant doser, and/or an area under a time-injection rate curve of a reductant doser. An exemplary procedure includes an operation to provide the adjusted reductant amount target by determining a rate of the transient event.

An exemplary procedure includes an operation to detect the transient event by determining a change event including a $NO_x$ reduction catalyst temperature change. An increasing $NO_x$ reduction catalyst temperature reduces the $NH_3$ storage capacity of the $NO_x$ reduction catalyst, releasing stored $NH_3$ from the catalyst. The procedure includes an operation to reduce the reductant injection amount during the increasing $NO_x$ reduction catalyst temperature. A decreasing $NO_x$ reduction catalyst temperature increases the $NH_3$ storage capacity, providing an opportunity for excess $NH_3$ to be stored on the $NO_x$ reduction catalyst, and providing capacity to minimize the effects of a subsequent $NO_x$ production spike from the engine, reducing aggregate $NO_x$ emissions of the system. The procedure includes an operation to increase the reductant injection amount during the decreasing $NO_x$ reduction catalyst temperature.

An exemplary procedure includes an operation to detect the transient event by determining an exhaust mass flow rate change. An increasing exhaust mass flow rate reduces the catalyst space velocity and thereby the available $NO_x$ reduction efficiency. A decreasing exhaust mass flow rate increases the catalyst space velocity and thereby the available $NO_x$ reduction efficiency. Further, changes in the mass flow rate may affect the rate-limiting step of the catalytic reaction, for example between mass transfer, pore diffusion, and/or reaction rate limited steps. Accordingly, the $NO_x$ reduction efficiency typically decreases with the exhaust mass flow rate, but the nature of the decrease is specific to a particular system. The determination of an exhaust mass flow rate relationship with the $NO_x$ reduction efficiency is a mechanical step for one of skill in the art contemplating a particular system.

In response to an increasing $NO_x$ reduction efficiency, an exemplary procedure increases the reductant injection take advantage of additional available $NO_x$ reduction while limiting $NH_3$ slip from the system, or decreases the reductant injection amount to take advantage of the improved $NO_x$ conversion efficiency and meet $NO_x$ emissions levels with a reduced amount of reductant. In response to a decreasing $NO_x$ reduction efficiency, an exemplary procedure decreases the reductant injection to limit $NH_3$ slip from the system, or increases the reductant injection amount to improve the $NO_x$ conversion amount in light of the reduced $NO_x$ conversion efficiency.

An exemplary procedure includes an operation to detect the transient event by determining a catalyst space velocity change. The operation to determine the catalyst space velocity change includes determining an exhaust mass (or volumetric) flow rate and a catalyst amount (mass or bed volume). The catalyst amount may change with time due to catalyst aging, deactivation, and/or due to a portion of the catalyst being bypassed or at a temperature outside of an active temperature range. Accordingly, the catalyst space velocity, in certain embodiments, is not determined solely in response to the exhaust mass flow rate.

In response to a decreasing catalyst space velocity, an exemplary procedure increases the reductant injection take advantage of additional available $NO_x$ reduction while limiting $NH_3$ slip from the system, or decreases the reductant injection amount to take advantage of the improved $NO_x$ conversion efficiency and meet $NO_x$ emissions levels with a reduced amount of reductant. In response to an increasing catalyst space velocity, an exemplary procedure decreases the reductant injection to limit $NH_3$ slip from the system, or increases the reductant injection amount to improve the $NO_x$ conversion amount in light of the reduced $NO_x$ conversion efficiency. In certain embodiments, the catalyst space velocity adjustment is applied as a limit to the injection rate of reductant, where a maximum amount of reactable $NO_x$ is determined as limited by the catalyst temperature, space velocity, and $NO_x$ concentrations present, and the maximum amount of reductant is applied as a limit against an otherwise nominal reductant dosing amount.

Another exemplary procedure is described following. The exemplary procedure includes an operation to interpret a reductant amount target that is a target amount of reductant in an exhaust conduit at a position upstream of an SCR catalyst and an operation to detect a transient event in the SCR catalyst. The procedure includes an operation to provide an adjusted reductant amount target in response to the transient event. The procedure further includes an operation to provide a reductant doser command in response to the adjusted reductant amount target.

The exemplary procedure further includes an operation to detect a transient event as an event that is expected to cause a change in an ammonia storage capacity of the SCR catalyst and/or a $NO_x$ reduction efficiency of the SCR catalyst. In certain embodiments, detecting the transient event includes determining a temperature change event in the SCR catalyst, and/or determining an imminent temperature change event. Another exemplary embodiment includes detecting the transient event by determining an exhaust mass flow rate change event in the SCR catalyst, and/or determining an imminent exhaust mass flow rate change event. Yet another exemplary embodiment includes detecting the transient event by determining a catalyst space velocity change event, and/or determining an imminent exhaust catalyst space velocity change event.

An exemplary system includes an internal combustion engine, an exhaust conduit fluidly coupled to the internal combustion engine, and an SCR catalyst fluidly coupled to the exhaust conduit. The system further includes a reductant doser operationally coupled to the exhaust conduit at a position upstream of the SCR catalyst, and a means for detecting a transient event in the SCR catalyst.

Exemplary and non-limiting examples of a means for detecting a transient event in the SCR catalyst are described. An exemplary means for detecting a transient event includes detecting a temperature increase or decrease in an exhaust stream, in an SCR catalyst, and/or in a component or temperature sensor positioned upstream of the SCR catalyst. Another exemplary means for detecting a transient event includes detecting a parameter indicative of an imminent temperature increase or decrease in the SCR catalyst, including a temperature change upstream of the SCR catalyst, a change in a torque or power request input to an engine (e.g. an accelerator pedal position change, governor switch, and/or engine controls torque reference value), a system load increase or decrease determination, and/or a determination that a vehicle including the SCR catalyst has entered or is approaching an increased grade or decreased grade. Another exemplary means for detecting a transient event includes detecting that an exhaust mass flow rate is increasing or decreasing, or that an imminent increase or decrease in the exhaust mass flow rate is present. Exemplary operations to determine an imminent increase or decrease in exhaust mass flow rate include a change in a torque or power request input to an engine, a vehicle launch indication (e.g. according to a clutch pedal position or engine speed to vehicle speed correlation), an engine speed change, and/or a turbocharger operating conditions change (speed, bypass or wastegate position, and/or variable geometry position).

The exemplary system further includes a means for adjusting a reductant injection amount in response to the transient event. Exemplary and non-limiting examples of a means for adjusting the reductant injection amount are described following. An exemplary means for adjusting the reductant injection amount includes increasing the reductant injection amount in response to a transient event that increases the storage capacity of the SCR catalyst (e.g. a lowering temperature). Another exemplary means for adjusting the reductant injection amount includes decreasing the reductant injection amount in response to a transient event that decreases the storage capacity of the SCR catalyst (e.g. an increasing temperature).

The exemplary system further includes a means for detecting an $NH_3$ storage increase amount, and a means for filling an $NH_3$ storage of the SCR catalyst. Exemplary and non-limiting examples of a means for detecting an $NH_3$ storage increase amount and for filling the $NH_3$ storage of the SCR catalyst are described. An exemplary means for detecting an $NH_3$ storage increase amount includes determining a first storage amount before a temperature decrease event, a second storage amount after the temperature decrease event, and determining a storage increase amount in response to the first storage amount and the second storage amount. In certain embodiments, the first storage amount may be estimated to be zero if the initial temperature of the SCR catalyst exceeds a threshold temperature before the temperature decrease event.

An exemplary means for filling the $NH_3$ storage of the SCR catalyst includes increasing the reductant injection amount in response to the storage increase amount. The increasing the reductant injection amount can be a predetermined increase amount for a time determined according to the storage increase amount, an increase for a predetermined time at an increased injection rate determined according to the storage increase amount, and/or an integrated amount of increased reductant injection such that an area under an injection rate-time curve is completed, where the area is determined according to the storage increase amount. The total amount of excess reductant injected is determined as an amount required to fill the NH$_3$ storage of the SCR catalyst, or a selected portion of the NH$_3$ storage of the SCR catalyst.

In certain embodiments, the system includes a means for detecting an NH$_3$ storage decrease amount, and a means for preventing NH$_3$ slip to an ambient environment. Exemplary and non-limiting examples of a means for detecting an NH$_3$ storage decrease amount, and a means for preventing NH$_3$ slip to an ambient environment are described. An exemplary means for detecting an NH$_3$ storage decrease amount includes determining a first storage amount before a temperature increase event, a second storage amount after the temperature increase event, and determining a storage decrease amount in response to the first storage amount and the second storage amount. In certain embodiments, the second storage amount may be estimated to be zero if the temperature of the SCR catalyst after the temperature increase exceeds a threshold temperature.

An exemplary means for preventing NH$_3$ slip to an ambient environment includes reducing a reductant injection rate for at least a portion of the time during the temperature increase event. Another exemplary means for preventing NH$_3$ slip includes accessing an NH$_3$ release model or correlation according to observed temperatures at the SCR catalyst, and injecting a reductant amount that is limited according to the released NH$_3$ amount and an acceptable NH$_3$ slip amount, and may further be adjusted according to a presence and capability of an AMOX catalyst at the present operating temperature of the AMOX.

Yet another exemplary embodiment of the system includes a means for decreasing a reductant injection amount in response to a temperature increase transient. In certain embodiments, an NH$_3$ release correlation is calibrated in a controller, and the reductant injection amount is reduced taking into consideration the present NO$_x$ amount out of the engine, a NO$_x$ conversion (and thereby NH$_3$ consumption) amount on the SCR catalyst, an acceptable maximum NH$_3$ slip amount, an acceptable minimum NO$_x$ conversion amount, and the presence and capability of an AMOX catalyst to oxidize NH$_3$.

Yet another exemplary embodiment includes a means for increasing a reductant injection amount in response to a temperature decrease transient. In certain embodiments, an NH$_3$ uptake (or adsorption) correlation is calibrated in a controller, and the reductant injection amount is increased taking into consideration the present NO$_x$ amount out of the engine, a NO$_x$ conversion (and thereby NH$_3$ consumption) amount on the SCR catalyst, an acceptable maximum NH$_3$ slip amount, and the presence and capability of an AMOX catalyst to oxidize NH$_3$.

As is evident from the figures and text presented above, a variety of embodiments according to the present invention are contemplated.

An exemplary set of embodiments is a method including interpreting a reductant amount target comprising a target amount of reductant in an exhaust conduit at a position upstream of a NO$_x$ reduction catalyst and detecting a transient event. The transient event includes an event that is expected to cause a change in at least one of a reductant storage capacity of the NO$_x$ reduction catalyst and a NO$_x$ reduction efficiency of the NO$_x$ reduction catalyst. In response to the transient event, the method includes providing an adjusted reductant amount target, and providing a reductant doser command in response to the adjusted reductant amount target.

Certain further embodiments of the method are described following. An exemplary method includes the transient event as a temperature decreasing event, and providing the adjusted reductant amount target as an amount greater than the reductant amount target. Another exemplary method includes the transient event as a temperature increasing event, and providing the adjusted reductant amount target as an amount less than the reductant amount target.

In certain embodiments, providing the adjusted reductant amount target includes determining a magnitude of the transient event. In certain further embodiments, the method includes determining the adjusted reductant amount to have a magnitude determined in response to the magnitude of the transient event. The magnitude of the actuator transient adjustment may be an injection rate adjustment of a reductant doser, and/or an area under a time-injection rate curve of a reductant doser. An exemplary method includes providing the adjusted reductant amount target by determining a rate of the transient event. In one form, the method includes detecting the transient event by determining a change event including a NO$_x$ reduction catalyst temperature change, an exhaust mass flow rate change, an incoming NO$_x$ amount change, and/or a catalyst space velocity change.

Another exemplary set of embodiments is a method including interpreting a reductant amount target that is a target amount of reductant in an exhaust conduit at a position upstream of an SCR catalyst, detecting a transient event in the SCR catalyst, and providing an adjusted reductant amount target in response to the transient event. The method further includes providing a reductant doser command in response to the adjusted reductant amount target.

Certain further embodiments of the exemplary method are described following. A method includes detecting the transient event as an event that is expected to cause a change in an ammonia storage capacity of the SCR catalyst and/or a NO$_x$ reduction efficiency of the SCR catalyst. In certain embodiments, detecting the transient event includes determining a temperature change event in the SCR catalyst, and/or determining an imminent temperature change event. Another exemplary method includes detecting the transient event by determining an exhaust mass flow rate change event in the SCR catalyst, and/or determining an imminent exhaust mass flow rate change event. Yet another exemplary method includes detecting the transient event by determining a catalyst space velocity change event, and/or determining an imminent exhaust catalyst space velocity change event.

Another exemplary set of embodiments is a system including an internal combustion engine, an exhaust conduit fluidly coupled to the internal combustion engine, and an SCR catalyst fluidly coupled to the exhaust conduit. The system includes a reductant doser operationally coupled to the exhaust conduit at a position upstream of the SCR catalyst, where the reductant doser is responsive to a reductant doser command. The system further includes a controller having modules structured to functionally execute operations for transient compensation control of an SCR aftertreatment system.

The exemplary controller includes an ammonia (NH$_3$) target module that interprets a reductant amount target. The reductant amount target is a target amount of reductant in the exhaust conduit at a position upstream of the SCR catalyst. The controller further includes a transient adjustment module that detects a transient event in the SCR catalyst and provides an adjusted reductant amount target in response to the transient event and the reductant amount target. The controller further includes a dosing control module that provides the reductant doser command in response to the adjusted reductant amount target.

Certain further exemplary embodiments of the system are described following. In certain embodiments, the transient event includes a temperature decreasing event, and the transient adjustment module provides the adjusted reductant amount target as an amount greater than the reductant amount target. In certain embodiments, the adjusted reductant amount target includes an actuator transient adjustment having a magnitude determined in response to a magnitude of the transient event and/or a magnitude of the rate of the transient event. The magnitude of the actuator transient adjustment includes an injection rate adjustment, and/or an area under a time-injection rate curve.

In certain embodiments, the $NH_3$ target module provides the reductant amount target in response to an $NH_3$ to $NO_x$ ratio (ANR) target. In certain further embodiments, the transient adjustment module provides the adjusted reductant amount target as an adjusted ANR target. An exemplary system includes the transient adjustment module providing the adjusted reductant amount target in response to an incoming $NO_x$ amount into the SCR catalyst, an SCR catalyst space velocity, a current exhaust mass flow rate, and/or an SCR catalyst temperature.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   interpreting a reductant amount target comprising a target amount of reductant in an exhaust conduit at a position upstream of a $NO_x$ reduction catalyst;
   detecting a transient event, the transient event comprising an event that is expected to cause a change in a reductant storage capacity of the $NO_x$ reduction catalyst, wherein the transient event further comprises a temperature decreasing event;
   in response to the transient event, providing an adjusted reductant amount target as an amount greater than the reductant amount target; and
   providing a reductant doser command in response to the adjusted reductant amount target.

2. A method, comprising:
   interpreting a reductant amount target comprising a target amount of reductant in an exhaust conduit at a position upstream of a $NO_x$ reduction catalyst;
   detecting a transient event, the transient event comprising an event that is expected to cause a change in at least one of a reductant storage capacity of the $NO_x$ reduction catalyst and a $NO_x$ reduction efficiency of the $NO_x$ reduction catalyst;
   in response to the transient event, providing an adjusted reductant amount target; and
   providing a reductant doser command in response to the adjusted reductant amount target; and
   wherein providing the adjusted reductant amount target comprises determining a magnitude of the transient event, determining an actuator transient adjustment having a magnitude determined in response to the magnitude of the transient event, and further determining the magnitude of the actuator transient adjustment as an area under a time-injection rate curve of a reductant doser.

3. The method of claim 2, further comprising determining the magnitude of the actuator transient adjustment as an injection rate adjustment of a reductant doser.

4. A method, comprising:
   interpreting a reductant amount target comprising a target amount of reductant in an exhaust conduit at a position upstream of a $NO_x$ reduction catalyst;
   detecting a transient event, the transient event comprising an event that is expected to cause a change in at least one of a reductant storage capacity of the $NO_x$ reduction catalyst and a $NO_x$ reduction efficiency of the $NO_x$ reduction catalyst;
   in response to the transient event, providing an adjusted reductant amount target;
   providing a reductant doser command in response to the adjusted reductant amount target; and
   wherein providing the adjusted reductant amount target comprises determining a rate of the transient event.

5. A method, comprising:
   interpreting a reductant amount target comprising a target amount of reductant in an exhaust conduit at a position upstream of a $NO_x$ reduction catalyst;
   detecting a transient event, the transient event comprising an event that is expected to cause a change in at least one of a reductant storage capacity of the $NO_x$ reduction catalyst and a $NO_x$ reduction efficiency of the $NO_x$ reduction catalyst;
   in response to the transient event, providing an adjusted reductant amount target;
   providing a reductant doser command in response to the adjusted reductant amount target; and
   wherein the detecting the transient event comprises determining at least one change event selected from the change events consisting of: a $NO_x$ reduction catalyst temperature change, an exhaust mass flow rate change, and a catalyst space velocity change.

6. A method, comprising:
   interpreting a reductant amount target comprising a target amount of reductant in an exhaust conduit at a position upstream of an SCR catalyst;
   detecting a transient event in the SCR catalyst, wherein the transient event comprises an event that is expected to cause a change in a $NO_x$ reduction efficiency of the SCR catalyst;
   in response to the transient event, providing an adjusted reductant amount target; and
   providing a reductant doser command in response to the adjusted reductant amount target.

7. The method of claim 6, wherein the detecting the transient event comprises determining a temperature change event in the SCR catalyst.

8. The method of claim 7, wherein the determining the temperature change event comprises determining an imminent temperature change event.

9. The method of claim 6, wherein the detecting the transient event comprises determining an exhaust mass flow rate change event in the SCR catalyst.

10. The method of claim 9, wherein the determining the exhaust mass flow rate change event comprises determining an imminent exhaust mass flow rate change event.

11. The method of claim 6, wherein the detecting the transient event comprises determining a catalyst space velocity change event.

12. The method of claim 11, wherein the determining the catalyst space velocity change event comprises determining an imminent exhaust catalyst space velocity change event.

13. A system, comprising:
an internal combustion engine;
an exhaust conduit fluidly coupled to the internal combustion engine;
an SCR catalyst fluidly coupled to the exhaust conduit;
a reductant doser operationally coupled to the exhaust conduit at a position upstream of the SCR catalyst, the reductant doser responsive to a reductant doser command;
a controller, comprising:
an ammonia ($NH_3$) target module structured to interpret a reductant amount target comprising a target amount of reductant in the exhaust conduit at a position upstream of the SCR catalyst;
a transient adjustment module structured to detect a transient event in the SCR catalyst and to provide an adjusted reductant amount target in response to the transient event and the reductant amount target, wherein the adjusted reductant amount target comprises an actuator transient adjustment comprising a magnitude determined in response to a magnitude of a rate of the transient event; and
a dosing control module structured to provide the reductant doser command in response to the adjusted reductant amount target.

14. The system of claim 13, wherein the transient event comprises a temperature decreasing event, and wherein the transient adjustment module provides the adjusted reductant amount target as an amount greater than the reductant amount target.

15. The system of claim 13, wherein the magnitude of the actuator transient adjustment comprises an injection rate adjustment.

16. The system of claim 13, wherein the magnitude of the actuator transient adjustment comprises an area under a time-injection rate curve.

17. The system of claim 13, wherein the $NH_3$ target module is further structured to provide the reductant amount target in response to an $NH_3$ to $NO_x$ ratio (ANR) target.

18. The system of claim 17, wherein the transient adjustment module is further structured to provide the adjusted reductant amount target as an adjusted ANR target.

19. The system of claim 13, wherein the transient adjustment module is further structured to provide the adjusted reductant amount target in response to at least one of an SCR catalyst space velocity and a current exhaust mass flow rate.

20. The method of claim 1, wherein the transient event further comprises an event that is expected to cause a change in a $NO_x$ reduction efficiency of the SCR catalyst.

21. The method of claim 20, wherein the detecting the transient event comprises determining a temperature change event in the SCR catalyst.

22. The method of claim 21, wherein the determining the temperature change event comprises determining an imminent temperature change event.

23. The method of claim 20, wherein the detecting the transient event comprises determining an exhaust mass flow rate change event in the SCR catalyst.

24. The method of claim 23, wherein the determining the exhaust mass flow rate change event comprises determining an imminent exhaust mass flow rate change event.

25. The method of claim 20, wherein the detecting the transient event comprises determining a catalyst space velocity change event.

26. The method of claim 25, wherein the determining the catalyst space velocity change event comprises determining an imminent exhaust catalyst space velocity change event.

* * * * *